United States Patent
Diersmann et al.

(10) Patent No.: US 9,248,490 B2
(45) Date of Patent: Feb. 2, 2016

(54) METHOD OF MANUFACTURING A TUBULAR STRUCTURAL PART, AND TUBULAR STRUCTURAL PART

(75) Inventors: Holger Diersmann, Westerkappeln (DE); Hans-Jürgen Knaup, Bad Lippspringe (DE); Rafael Garcia Gómez, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 13/553,154

(22) Filed: Jul. 19, 2012

(65) Prior Publication Data

US 2013/0020834 A1 Jan. 24, 2013

(30) Foreign Application Priority Data

Jul. 20, 2011 (DE) .................. 10 2011 051 965

(51) Int. Cl.
| | |
|---|---|
| *B21D 26/033* | (2011.01) |
| *B21D 37/16* | (2006.01) |
| *B21D 53/88* | (2006.01) |
| *B62D 25/04* | (2006.01) |

(52) U.S. Cl.
CPC .............. *B21D 26/033* (2013.01); *B21D 37/16* (2013.01); *B21D 53/88* (2013.01); *B62D 25/04* (2013.01); *Y10T 29/49622* (2015.01)

(58) Field of Classification Search
CPC .................................................... B21D 26/033
USPC ................... 148/519–521; 72/370.1, 370.22
See application file for complete search history.

(56) References Cited

U.S. PATENT DOCUMENTS

| | | | |
|---|---|---|---|
| 5,070,717 | A | 12/1991 | Boyd et al. |
| 6,261,392 | B1 | 7/2001 | Sundgren et al. |
| 6,394,335 | B2 | 5/2002 | Meier et al. |
| 6,524,404 | B2 | 2/2003 | Gehringhoff et al. |
| 6,623,055 | B2 | 9/2003 | Knaup et al. |
| 6,804,979 | B2 | 10/2004 | Gomez |
| 7,448,247 | B2 | 11/2008 | Knaup |
| 7,647,819 | B2 | 1/2010 | Garcia Gomez |
| 7,654,124 | B2 | 2/2010 | Knaup |

(Continued)

FOREIGN PATENT DOCUMENTS

| | | |
|---|---|---|
| CN | 101208236 A | 6/2008 |
| CN | 101269673 | 9/2008 |

(Continued)

OTHER PUBLICATIONS

Albert Sedlmaier: "Aktuelle Informationen der data M Software + Engineering GmbH", in: Newsletter für die rollformende und blechbearbeitende Industrie, Jan. 2005, pp. 1-12.

(Continued)

*Primary Examiner* — Brian Walck
(74) *Attorney, Agent, or Firm* — Henry M. Feiereisen LLC

(57) ABSTRACT

In a method of making a tubular structural part for a motor vehicle, a metal plate is contoured and preformed in at least one shaping step into a tubular body. Subsequently, the tubular body is end-formed into the structural part by internal high-pressure application while free contact regions snugly bear upon one another. The structural part is at least partially heated and quenched in a holding tool acted upon with a coolant.

5 Claims, 3 Drawing Sheets

(56) References Cited

U.S. PATENT DOCUMENTS

| | | | |
|---|---|---|---|
| 7,748,743 | B2 | 7/2010 | Knaup |
| 2001/0008228 | A1 | 7/2001 | Meier et al. |
| 2003/0046814 | A1 | 3/2003 | Knaup et al. |
| 2006/0255624 | A1 | 11/2006 | Zimmerman et al. |
| 2007/0187371 | A1 | 8/2007 | Knaup |
| 2007/0235111 | A1* | 10/2007 | Yang .......................... 148/570 |
| 2008/0035628 | A1 | 2/2008 | Dudziak |
| 2009/0038156 | A1 | 2/2009 | Hitz et al. |
| 2011/0171079 | A1 | 7/2011 | Garcia Gomez |

FOREIGN PATENT DOCUMENTS

| | | |
|---|---|---|
| DE | 24 52 486 | 5/1975 |
| DE | 26 03 618 | 12/1976 |
| DE | 198 13 012 | 10/1999 |
| DE | 100 12 974 | 3/2001 |
| DE | 698 03 588 | 2/2002 |
| DE | 101 41 503 | 10/2002 |
| DE | 103 12 028 | 10/2004 |
| DE | 103 48 086 | 5/2005 |
| DE | 102004041024 | 3/2006 |
| DE | 102005028010 | 7/2006 |
| DE | 102007018281 | 10/2008 |
| DE | 102007062233 | 6/2009 |
| DE | 102009011932 | 9/2010 |
| EP | 1 172 281 | 1/2002 |
| EP | 1 342 515 | 9/2003 |
| JP | 2007-533462 | 11/2007 |
| WO | WO 98/24569 | 6/1998 |
| WO | WO 99/27142 | 6/1999 |
| WO | WO 2005/021180 | 3/2005 |
| WO | WO 2009/133454 | 11/2009 |
| WO | WO 2010/105341 | 9/2010 |

OTHER PUBLICATIONS

Thyssen-Krupp Steel: "Ressourcenschonender Leichtbau mit Stahl", in:Konzern, Aug. 2009.

Bernd Engel at al.: Potentiate und Fertigungsstrategien zur geometrischen Gestaltung von Profilbauteilen, Verlag Meisenbach GmbH, 2011, pp. 1-30.

"Innenhochdruck-Umformung von endkonturnahen Tailored Tubes", in: Maschinenmarkt, Sep. 18, 2015.

* cited by examiner

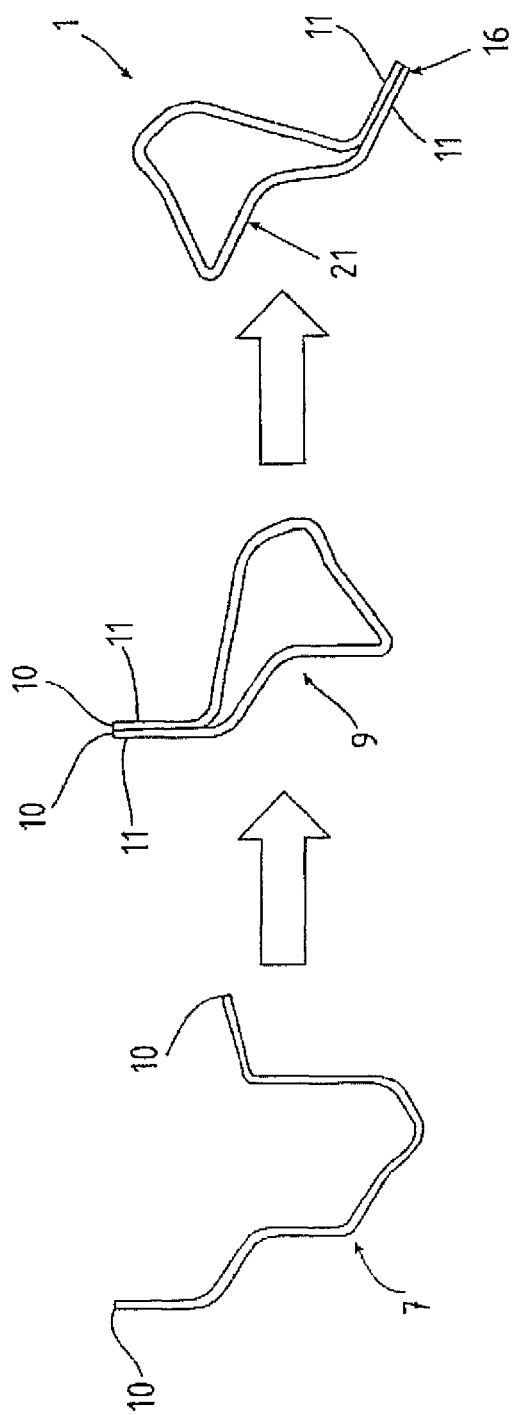

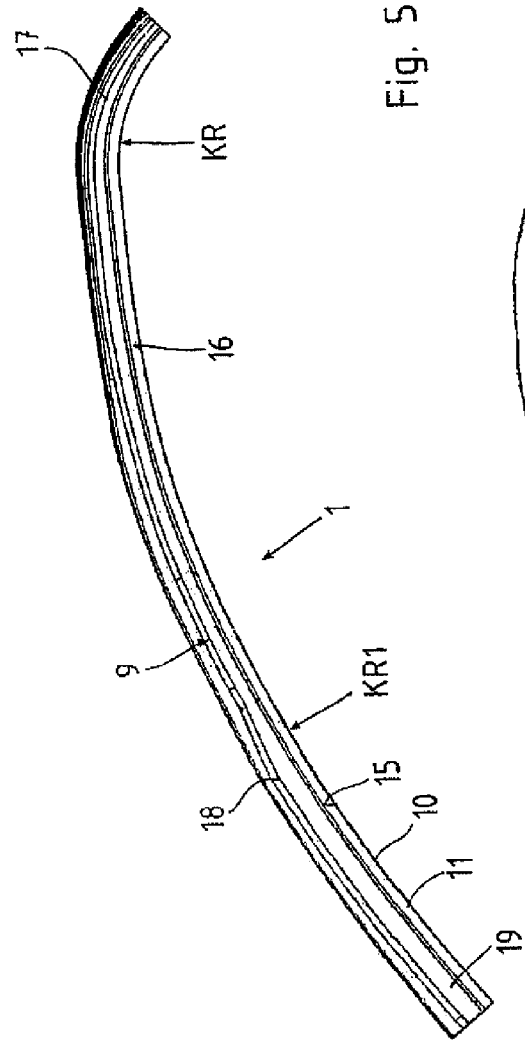
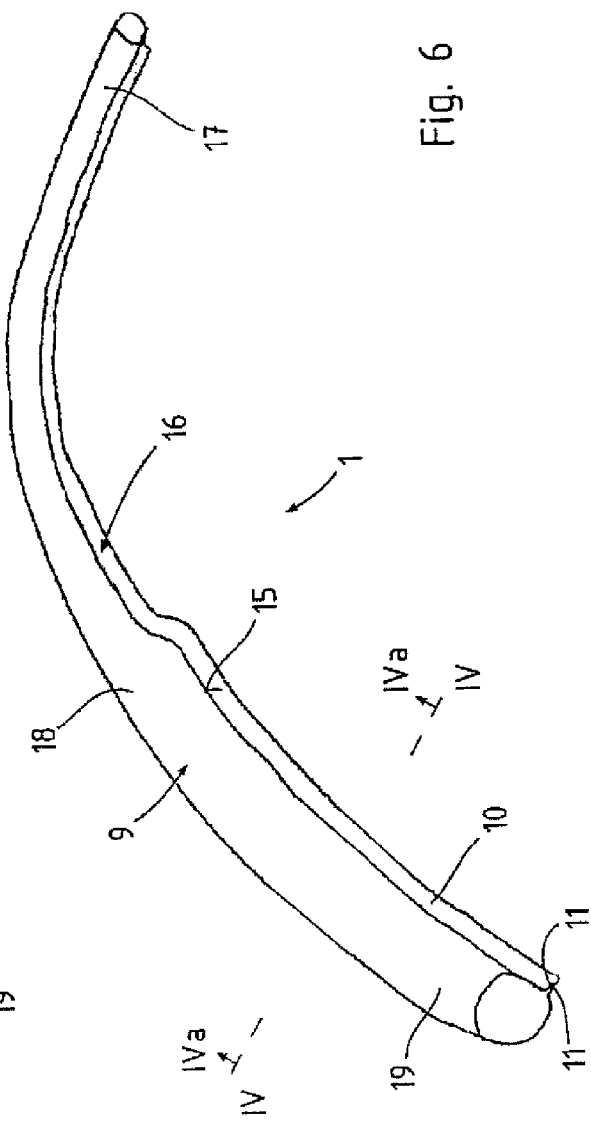

METHOD OF MANUFACTURING A TUBULAR STRUCTURAL PART, AND TUBULAR STRUCTURAL PART

CROSS-REFERENCES TO RELATED APPLICATIONS

This application claims the priority of German Patent Application, Serial No. 10 2011 051 965.2, filed Jul. 20, 2011, pursuant to 35 U.S.C. 119(a)-(d), the content of which is incorporated herein by reference in its entirety as if fully set forth herein.

BACKGROUND OF THE INVENTION

The present invention relates to a method of manufacturing a tubular structural part for a motor vehicle, and to a tubular structural part for a motor vehicle, in particular a passenger vehicle.

It would be desirable and advantageous to provide an improved method of manufacturing a tubular structural part for a motor vehicle, and an improved structural part of a motor vehicle, to obviate prior art shortcomings and to enable a cross section reduction of the structural part while yet increasing rigidity thereof.

SUMMARY OF THE INVENTION

According to one aspect of the present invention, a method of making a tubular structural part for a motor vehicle includes trimming a metal plate about its circumference, forming the metal plate into a tubular body with edge-side contact regions in opposition to one another, end-forming the tubular body into a structural part using internal high-pressure application to thereby tightly compress the contact regions, heating the structural part at least in part, and quenching the structural part in a holding tool acted upon with coolant.

According to another aspect of the present invention, a method of making a tubular structural part for a motor vehicle includes trimming a metal plate about its circumference, heating the metal plate, preforming the plate in a first shaping step into a U shape by isothermal heating, isothermally heating the U-shaped plate in a second shaping step to transform it into a tubular body with edge-side contact regions in opposition to one another, end-forming the tubular body into a structural part using internal high-pressure application while the contact regions snugly bear upon one another, and quenching the structural part in a holding tool acted upon with a coolant.

According to yet another aspect of the present invention, a method of making a tubular structural part for a motor vehicle includes trimming a metal plate about its circumference, heating the metal plate, preforming the plate in a first shaping step into a U shape by isothermal heating, isothermally heating the U-shaped plate in a second shaping step to transform it into a tubular body with edge-side contact regions in opposition to one another, end-forming and quenching the tubular body into a structural part in an internal high-pressure tool acted upon with a coolant, while the contact regions snugly bear upon one another.

According to still another aspect of the present invention, a method of making a tubular structural part for a motor vehicle includes trimming a metal plate about its circumference, heating the metal plate, preforming the plate in a first shaping step into a U shape and at least partially quenching the plate, at least partially heating the preformed plate in a second shaping step into a tubular body with edge-side contact regions in opposition to one another, end-forming the tubular body into a structural part using internal high-pressure application while the contact regions snugly bear upon one another, and quenching the structural part in a holding tool.

In accordance with the present invention, it is now possible in advantageous manner to produce A pillars and B pillars of a motor vehicle chassis so that with a relevant cross section optimization and viewing angle improvement also higher rigidity with lower weight and higher power consumption are provided. Furthermore, with a method according to the present invention sills, roof frames, crossbeams, end walls and longitudinal beams for motor vehicles can be produced.

According to an advantageous feature of the present invention, the metal plate can be shaped into a U shape before being shaped it into the tubular body. Lateral longitudinal regions of the tubular body can be positioned to bear upon one another in a flange-shaped manner and in an end-forming process can be tightly compressed using an internal high-pressure forming process. A linear contact of the longitudinal regions may also be conceivable. A tempering for the purpose of hardening is carried out by heating of the plate or a preformed semi-finished product with a subsequent quenching in a form tool or in a separate holding tool.

After U-shaped transforming or deep drawing of the trimmed plate, the longitudinal edges of the longitudinal regions can be trimmed, in the event this becomes necessary during deep drawing because of geometrical considerations for example.

Thereafter, at least one one-step tubular bending of the end portions of the U-shaped semi-finished product is performed. Advantageously, this can be carried out with an internal counter stop in form of at least one mandrel. For obtaining smaller curvatures in the longitudinal direction of the tubular body, it is advantageous to use segmented or divided interconnected mandrels, for example insertion mandrels, or two separate mandrels which can be introduced from both end portions of the tubular body. At least one mandrel segment intended to support a region of the greatest curvature of the structural part can be designed complementarily.

It will be understood by persons skilled in the art that in accordance with the present invention contact regions which snugly bear upon one another relate to a fluid-tight abutment in such a way as to allow execution of an internal high-pressure forming process. This applies to all embodiments described in the disclosure.

Examples of materials used include high strength boron-alloyed steels, for example AlSi-coated hot-formed steels or zinc-coated hot-formed steels, or BTR 165. An example of a composition and characteristic of BTR is disclosed in US 20050109433.

As far as heating is concerned in the course of process steps, heating before a shaping step permits application of a smaller pressing force or a higher shaping degree. With a structural part temperature greater than AC3 directly before quenching, it is possible to produce a fully hardened structural part. The greater transforming degrees, in particular the smaller bending radii, are particularly significant compared with the exclusive use of the internal high-pressure forming process.

A heating to greater than AC3 in accordance with iron-carbon diagram can be performed when hardening is to be carried out before the internal high-pressure forming process or a subsequent final quenching and tempering is performed. In the event of a later quenching and tempering, heating may be implemented before transforming into the U shape or tubular configuration to less than AC3. As described, heating or maintaining a moderate temperature can be carried out directly before the internal high-pressure forming process in an internal high-pressure tool or in a downstream stationary heating device. Furthermore, heating or maintaining at a moderate temperature may be conceivable in a downstream transfer via a conjointly moving heating unit. Heating can be carried out inductively, resistively, capacitively, conductively, or by infrared radiation.

Cooling may be provided in a special holding tool or also in the internal high-pressure tool by spraying, blowing on or immersing. This is performed in particular with a cooled forming tool during internal high-pressure forming process or in a further holding tool.

As the tubular body is kept shut during the internal high-pressure forming process, care should be taken that the linear contact regions which limit the longitudinal slot of the tubular body can be pressed against each other so as to withstand the internal high-pressure with corresponding high surface pressure.

Advantageously, the structural part is hardened by contact with a coolant in a forming space of the internal high-pressure tool during the internal high-pressure forming process. This can be realized, for example, by conducting coolant through inflow channels into the forming space. The aggregate state of the coolant should hereby be adjustable, with the coolant being introduced, e.g. injected, with a pressure up to 25 MPa into the forming space. As a result, a sufficiently high heat withdrawal from the structural part can be provided.

According to another advantageous feature of the present invention, a coolant can be applied at a pressure above its vapor pressure.

The end portions of the structural part can be advantageously provided with an at least approximately round cross section. This can be obtained with the use of the afore-mentioned mandrels.

According to yet another aspect of the present invention, a method of making a structural part in form of an A pillar for a passenger vehicle includes trimming a metal plate about its circumference, providing the trimmed metal plate with a U-shaped cross-section having convexly and concavely curved peripheral regions and longitudinal-side flanges, shaping the U-shaped cross section with flat contact of the flanges to a longitudinally curved tubular body with a lateral web located on an inner side of a curvature.

According to another advantageous feature of the present invention, the tubular body can have a first end portion with a cross section which is smaller than a cross section of a second end portion of the tubular body, with the first end portion of the tubular body having a radius of curvature which is smaller than a radius of curvature of a remaining longitudinal region of the tubular body.

According to yet another aspect of the present invention, a structural part for use as an A-pillar of a passenger vehicle includes a tubular body having a curvature in a longitudinal direction and provided on an inner side of the curvature with a transversely extending web from flanges bearing upon on one another, wherein the tubular body has a first end portion defined by a curvature which is greater than a curvature of a remaining longitudinal region of the tubular body.

According to another advantageous feature of the present invention, the first and second end portions of the tubular body can have a substantially round cross section, with the longitudinal region between the first and second end regions having a cross section which is multiply convexly and concavely curved.

According to another advantageous feature of the present invention, the first end portion can have a cross section which is smaller than a cross section of a second end portion of the tubular body.

According to another advantageous feature of the present invention, the first end portion can have a radius of curvature between 200 mm and 400 mm, preferably 300 mm.

According to another advantageous feature of the present invention, the remaining longitudinal region of the tubular body can have a radius of curvature of which is curved between 1500 mm and 3000 mm, preferably about 2000 mm.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic illustration of a plate which has been shaped into a U-shaped cross section;

FIG. 3 is a schematic illustration of a plate which has been shaped into a tubular body;

FIG. 4 is a schematic illustration of a structural part which is formed by an internal high-pressure forming process;

FIG. 5 is a side view of the structural part of FIG. 4; and

FIG. 6 is a perspective view of the structural part of FIGS. 4 and 5.

DETAILED DESCRIPTION OF PREFERRED EMBODIMENTS

Figure 1:
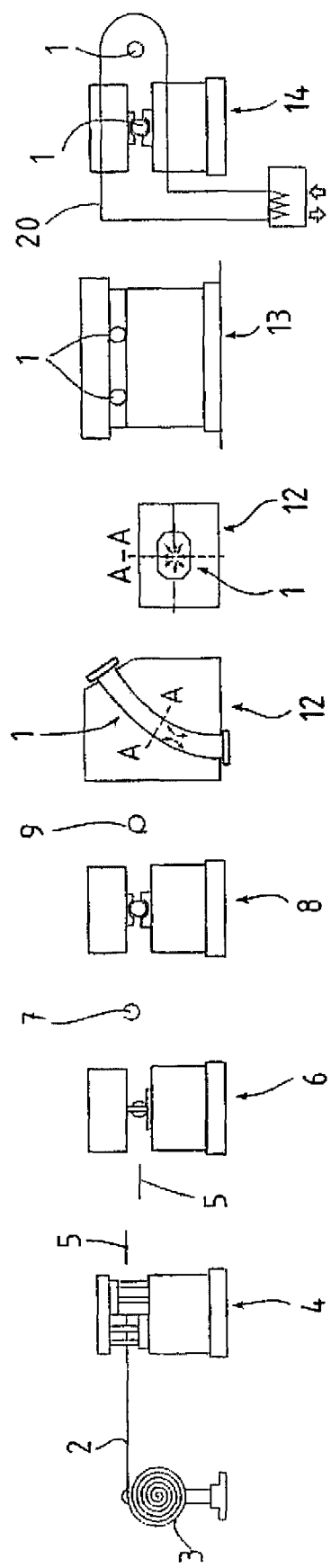
FIG. 1 is a schematic illustration of a flow diagram of a method of making a structural part in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

A method of manufacturing of a structural part 1 for a chassis of a passenger vehicle in form of an A pillar, and a geometry of this structural part are described in detail with reference to FIGS. 1-6 of the drawings.

Turning now to the drawing, and in particular to FIG. 1, there is shown a schematic illustration of a flow diagram of a method of making a structural part in accordance with the present invention. A metal strip 2 is drawn from a coil 3 and supplied to a punching device 4 in which the metal strip 2 is cut to correct size into plates 5 for further processing. Each plate 5 is shaped in a suitably designed press 6 into a U-shape in a first shaping step. FIG. 2 illustrates the exact cross section of the U-shape of the preformed plate 7 with longitudinal-side free contact regions 10.

The preformed plate 7 is then shaped in a further downstream press 8 into a tubular body 9 as shown in FIG. 3 The tubular body 9 has substantially the contour of an A pillar with the longitudinal-side free contact regions 10 of the tubular body 9 being formed on the flanges 11 which abut one another.

The tubular body 9, shown in FIG. 3, is end-formed in an internal high-pressure tool 12 into the structural part 1 (A pillar) and calibrated by it. The flanges 11 are tightly pressed against one another, as shown in FIGS. 4-6.

In a downstream stationary heating device 13, the structural part 1 is heated. This can be carried out inductively, resistively, capacitively, conductively or by infrared radiation. The heated structural part 1 is cooled in a holding tool 14 by spraying, blowing on or immersing and thereby tempered or hardened. The corresponding coolant circulation is identified with reference numeral 20.

In correspondence with the above described method for manufacturing a structural part 1 in form of an A pillar, other structural parts can be made as well, such as B pillars, longitudinal beams, sills, roof frames, cross beams or end walls.

According to a modification of the method shown in FIGS. 1-6, a trimmed plate 5 may also be heated before being shaped and preformed into a U shape by isothermal heating and then formed into a tubular shape also by isothermal heating, before being end-formed in an internal high-pressure tool 12 into the structural part 1. Heating can be carried out to a temperature above the AC 3 point in the iron-carbon diagram. This is true both for a hardening of the structural part 1 and for a subsequent tempering.

It is also conceivable to simultaneously end-form and quench the tubular boy 9, formed by heating, in an internal high-pressure tool 12.

Finally, it is also conceivable to heat a trimmed plate 5 before being formed into the tubular body 9. This is carried out preferably to a temperature below the AC3 point. After the U-shaped preforming, the plate 7 is quenched. The U-shaped preformed plate 7 is then again heated at least locally to greater than AC3 and finally shaped into the tubular body 9.

The tubular body 9 is then end-formed in an internal high-pressure tool 12, and thereafter optionally perforated and/or joined at the free contact regions 10. Joining can be carried out by MIG, MAG, WIG, or laser processes, by soldering or by a structural bond, and also by riveting, screwing, clinching etc. Finally, the structural part 1 is quenched in a cooled holding tool 14.

Examples of materials for the structural part 1 may include AlSi, pre-coated 22MnB5 or BTR165.

The internal high-pressure forming process can be implemented in particular with gas, for example $N_2$ or also with a suitable liquid.

The wall thickness of the structural part 1 can be limited to be equal to or smaller than 4 mm, and the bending radii can be up to 2 mm. The quenching times amount to 3 to 45 seconds. The transfer time between the individual tools amounts to 1 to 20 seconds. The forming time during the U-shaped preforming amounts to 1 to 20 seconds, while the transforming time into the tubular body 9 also amounts to 1 to 20 seconds. The time of the internal high-pressure forming process can be between 0.1 and 5 seconds. This ensures that no fluid medium is lost.

The flanges 11 of the structural part 1 can be joined also linearly, for example along the longitudinal-side contact regions 10. They may optionally be provided with depressions to increase rigidity.

The structural part 1 in the form of an A pillar for a passenger vehicle as shown in FIGS. 4-6 has a tubular body 9 which is curved in a longitudinal direction and which is provided on the inner side 15 of the curvature with a transversely extending web 16 from abutting flanges 11. An end portion 17 of the tubular body 9 has a greater curvature than the remaining longitudinal region 18. Both end portions 17, 19 of the tubular body 9 have at least approximately round cross section. The longitudinal region 18 between the end portions 17, 19 has a cross section 21 which is multiply convexly and concavely curved, as best seen in FIG. 4.

As can be seen in particular from FIG. 6, the end portion 17 of the tubular body 9 of greater curvature has a smaller cross section than the other end portion 19.

Furthermore, FIG. 5 shows that the end portion 17 has a radius of curvature KR between 200 mm and 400 mm, preferably 300 mm. The radius of curvature KR1 of the longitudinal region 18 which is adjacent to the end portion 17 with the greater radius of curvature amounts to between 1500 mm and 3000 mm, preferably 2000 mm.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making a tubular structural part for a motor vehicle, comprising the steps in the order of:
    trimming a metal plate about its circumference;
    forming the metal plate into a tubular body with edge-side contact regions snugly bearing upon one another;
    heating the tubular body to a temperature above the AC3 temperature point;
    end-forming the tubular body into a structural part in the absence of any preceding joining process using internal high-pressure application in an internal high-pressure tool while the contact regions are tightly compressed upon one another during the internal high-pressure forming process by a pressing force acting upon the contact regions; and
    cooling the tubular body in the tool during internal high-pressure forming process to thereby harden the tubular body.

2. The method of claim 1, wherein the forming step includes shaping the metal plate into a U shape before transforming it into the tubular body.

3. The method of claim 1, wherein the contact regions of the tubular body are formed on flange portions which flatly lie upon one another.

4. The method of claim 1, further comprising providing end portions of the tubular body with at least substantially round cross section.

5. The method of claim 4, wherein at least the end portions of the tubular body are each shaped by at least a mandrel.

* * * * *